Oct. 16, 1945.  B. BURNS  2,387,057
OIL COOLER FOR AIRCRAFT
Filed Jan. 25, 1943  6 Sheets-Sheet 2
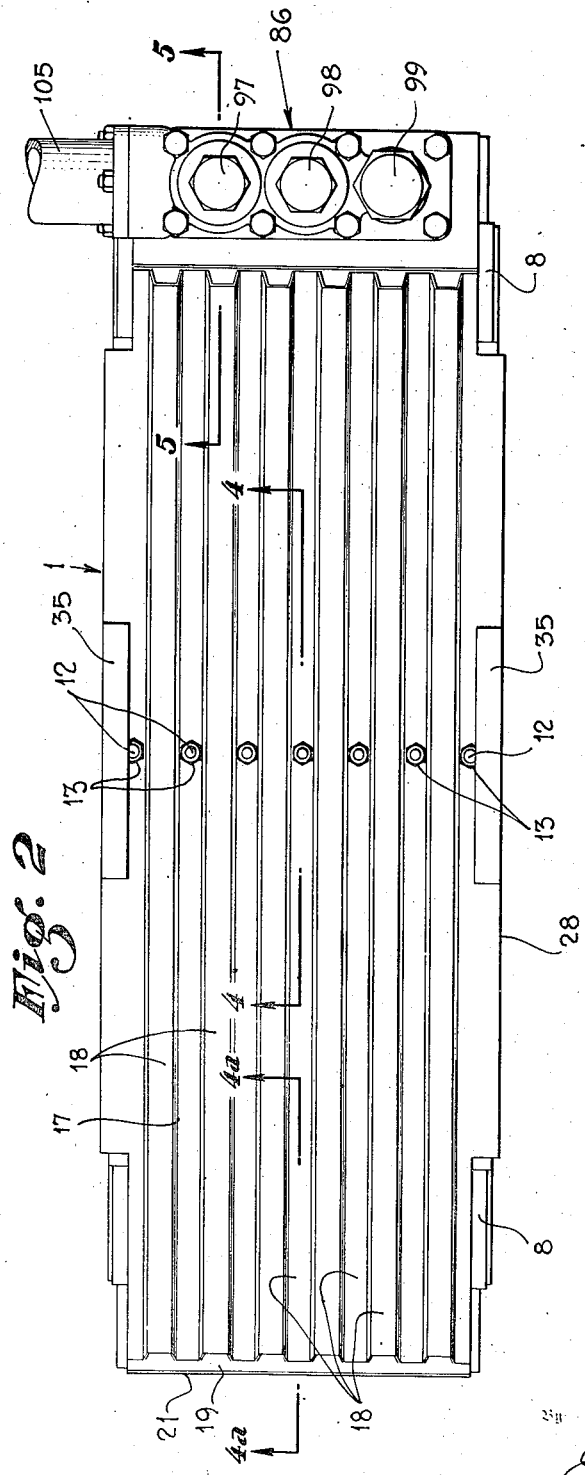
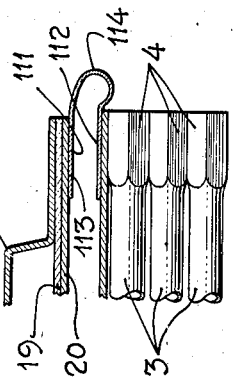
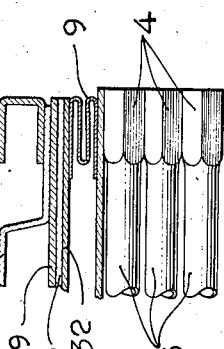
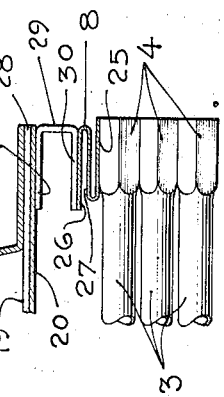
Inventor:
BRUCE BURNS,
Attorney.

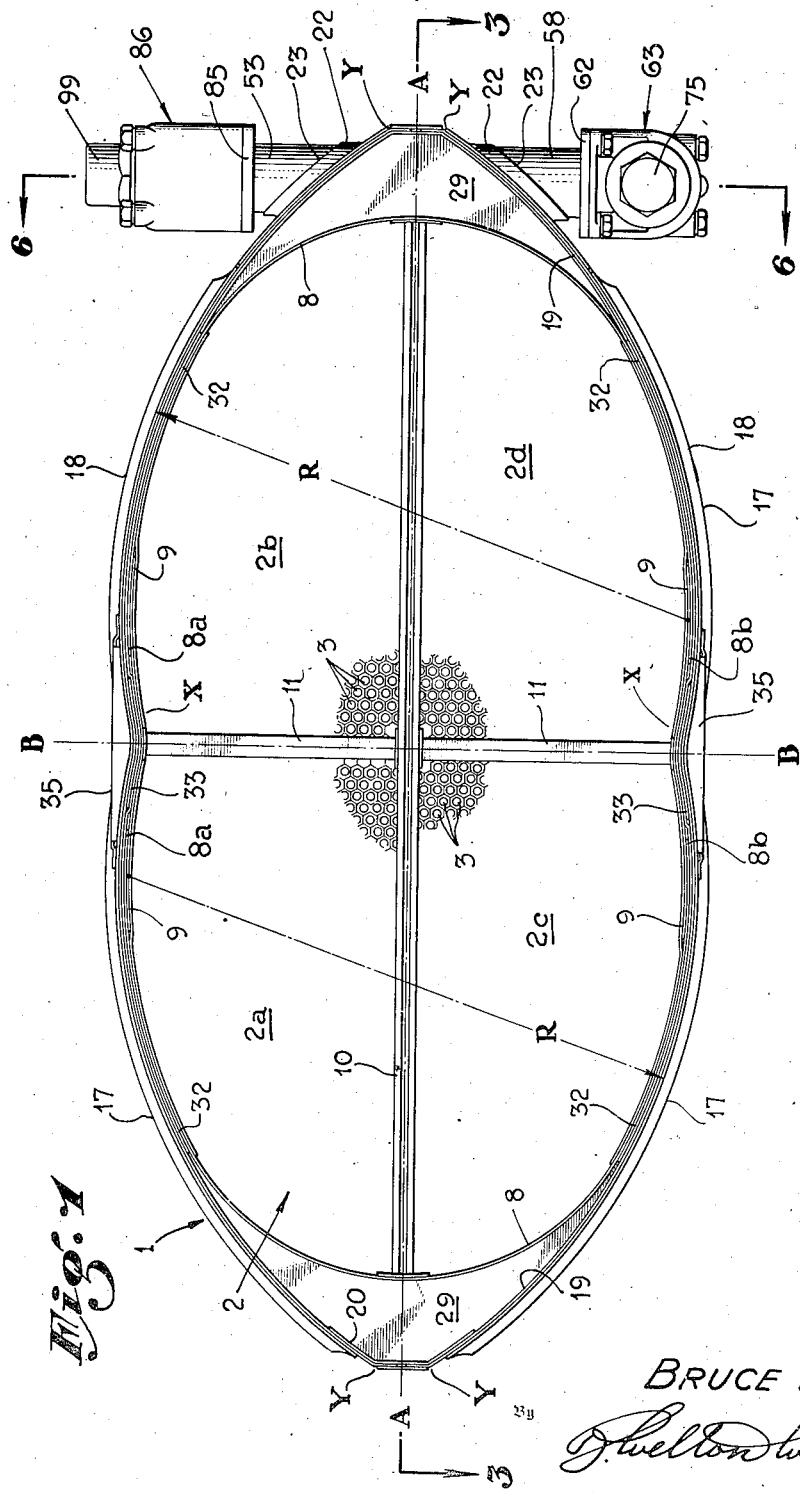

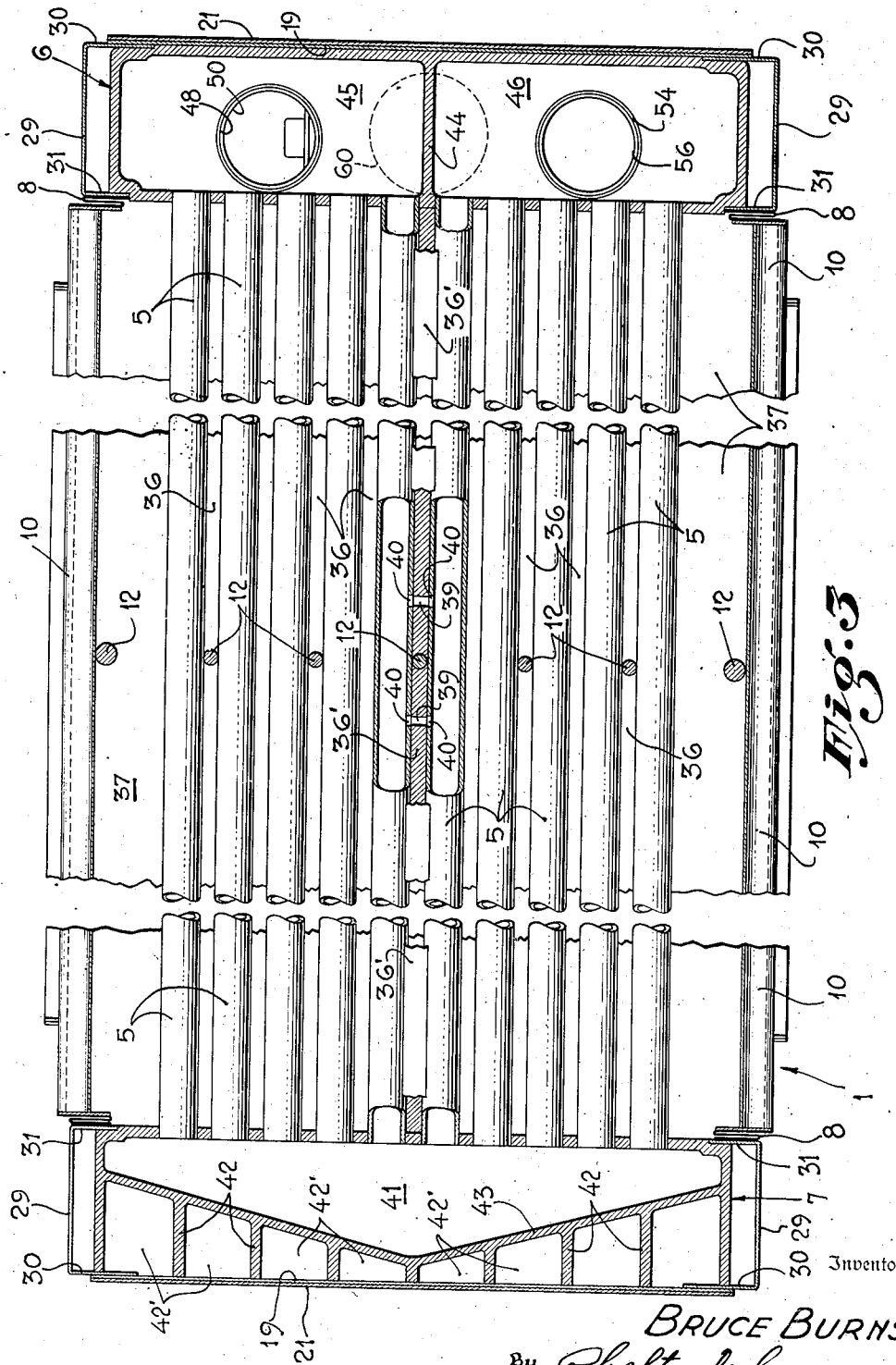

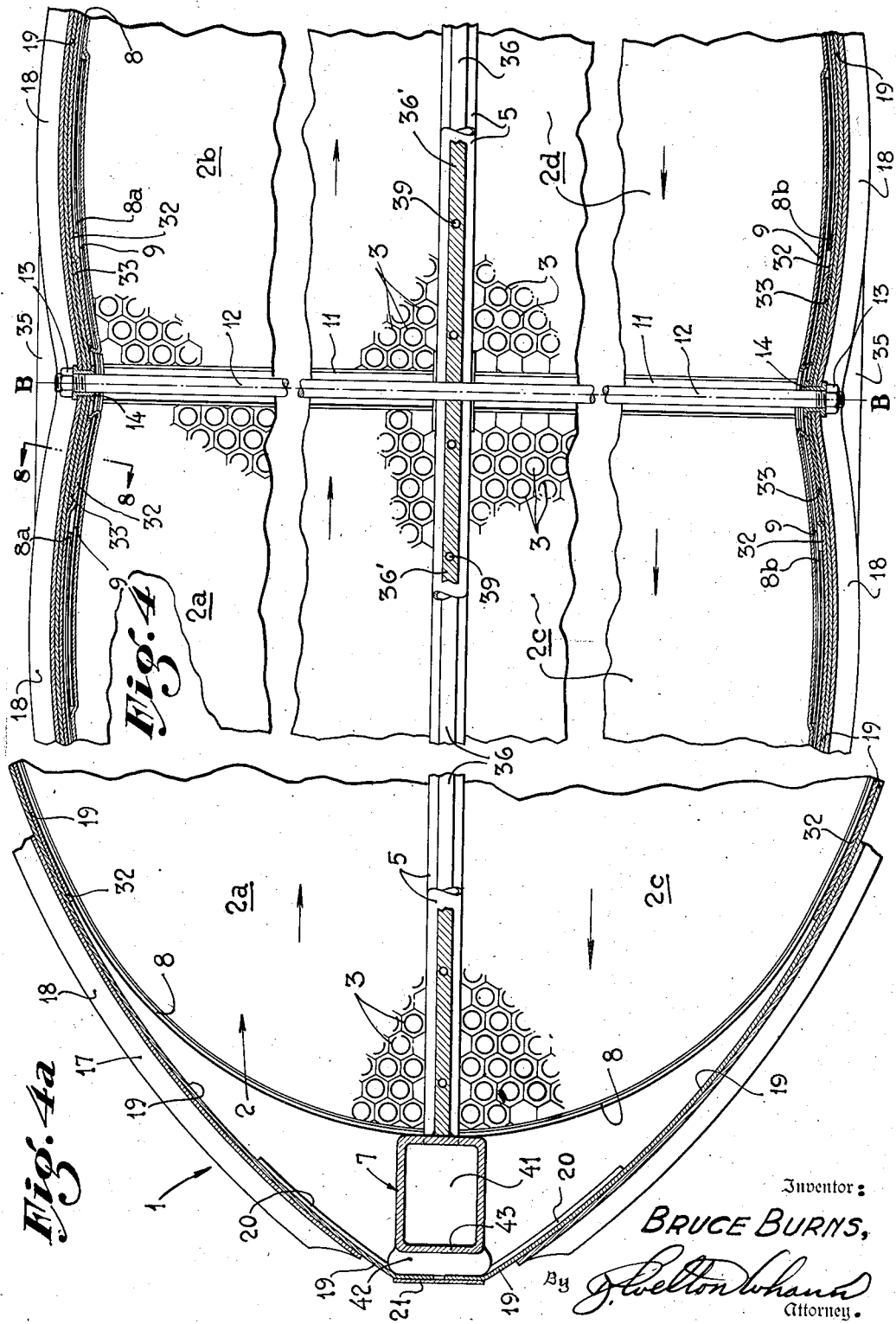

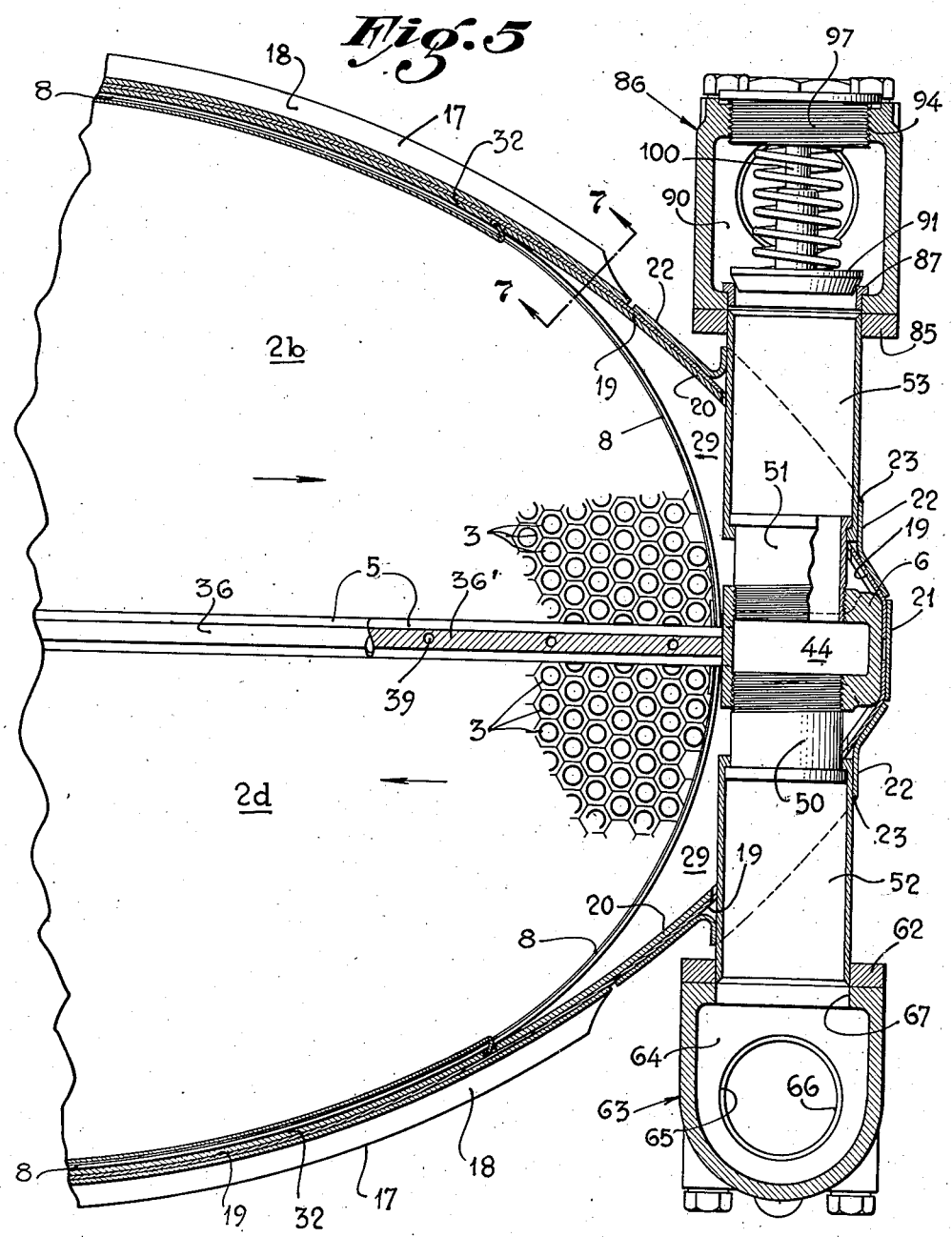

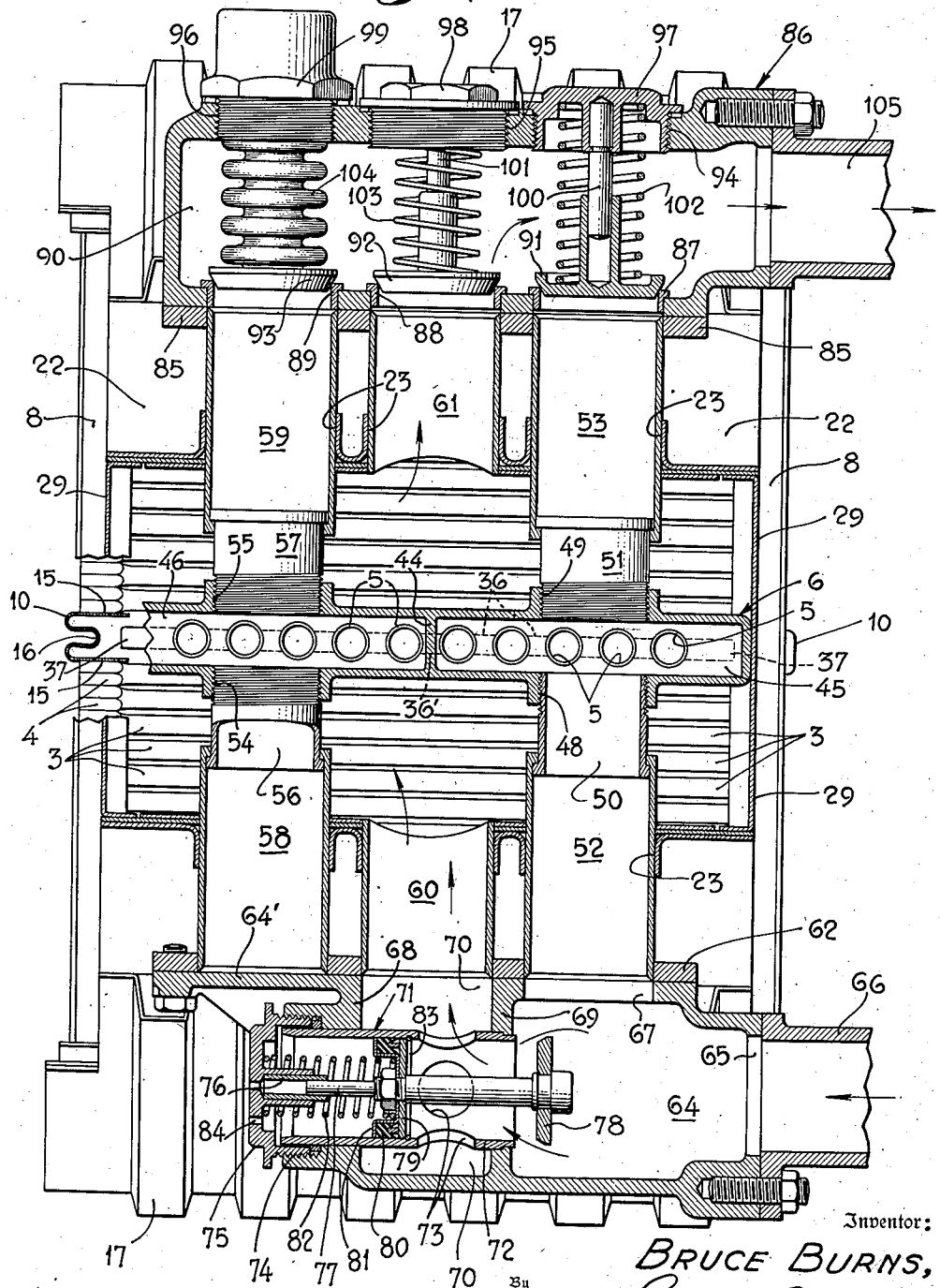

Patented Oct. 16, 1945

2,387,057

UNITED STATES PATENT OFFICE 2,387,057

OIL COOLER FOR AIRCRAFT

Bruce Burns, Los Angeles, Calif., assignor to The Garrett Corporation, Airesearch Manufacturing Company division, Los Angeles, Calif., a corporation of California Application January 25, 1943, Serial No. 473,544

4 Claims. (Cl. 257—128)

My invention relates in general to cooling devices, and relates in particular to a cooler for use in aircraft to cool engine oil.

In general, the objects of my invention include the provision of a cooler capable of sustaining high internal pressure, having high cooling efficiency, and having large capacity with respect to its height. In order that they may have maximum strength against the bursting effect of high internal pressures, oil coolers extensively employed in aircraft have been made cylindric in form, and the capacity or cross sectional area of a cooler employed in a given aircraft has been limited in many instances by the vertical dimension of the wing space to receive the cooler. In my present invention I provide a cooler which is horizontally elongated and therefore provided with increased capacity for a given height as determined by the vertical dimension of the airplane wing space which is to receive the cooler.

It is an object of the invention to provide a cooler which is elongated in cross section and has reenforcing means acting in tension along the minor axis thereof and which has means acting along its major axis to take compressive stresses, with the external walls curved in characteristic manner so as to act in tension in response to pressure built up within the cooler.

A further object of the invention is to provide a cooler of elongated cross section having inlet and outlet means disposed in positions offset to the side of the cooler and in such manner that they do not add to the vertical height of the cooler assembly.

A further object of the invention is to provide a cooler of elongated cross section having inlet and outlet means in end relation thereto, with provision for flow of the oil to be cooled in a direction substantially parallel to the major axis of the cooler.

A further object of the invention is to provide an oil cooler of elongated form having a major plane lying along its major axis and a minor plane lying along its minor axis, with an external wall consisting of wall sections which curve outward and extend from the minor plane to the major plane so as to form two somewhat elliptical lobes joined together at the minor plane.

A further object of the invention is to provide a cooling device having a novel form of bypass means capable of withstanding extremely high pressure and shock loads, and having means for protecting the core of the cooling device against excessive pressures.

A further object of the invention is to provide a cooler comprising a core and a shell with means connecting the core and the shell in a manner to compensate for differences in expansion and contraction of the shell and the core.

A further object of the invention is to provide new and improved inlet and outlet fittings for a cooler, and a still further object of the invention is to provide a novel construction forming a longitudinal bypass through the cooler shell and also means for carrying the longitudinal compression loads which are applied as the result of fluid pressure within the cooler acting outward against the walls of the shell so as to stress the same in tension.

It is a further object of the invention to provide a cooler and a valve mechanism associated with the cooler so as to be connected to the cooler in a number of different arrangements to enable use of the cooler in various positions and with inlet and outlet pipes of the cooler in a variety of positions.

Further objects and advantages of the invention will be brought out in the following part of the specification.

Referring to the drawings which are for illustrative purposes only,

Fig. 1 is a side elevation of a cooler embodying my invention.

Fig. 2 is a plan view of the same.

Fig. 3 is a plan section taken along the line 3—3 of Fig. 1.

Fig. 4 is an enlarged fragmentary sectional view of the central portion of the cooler taken along the line 4—4 of Fig. 2, with the upper and lower portions thereof moved inward.

Fig. 4a is a fragmentary sectional view of the leftward extremity of the cooler, taken also on the line 4—4 so as to cooperate with the fragmentary sectional view Fig. 4.

Fig. 5 is a similar view taken along the line 5—5 of Fig. 2.

Fig. 6 is a sectional elevation taken along the line 6—6 of Fig. 1.

Fig. 7 is an enlarged fragmentary sectional view taken as indicated by the line 7—7 of Fig. 5 to show the breather 8.

Fig. 8 is an enlarged fragmentary sectional view taken as indicated by the line 8—8 of Fig. 4 to show the breather 9.

Fig. 9 is a fragmentary view similar to Fig. 7 showing an alternative form of the breather member.

The embodiment of the invention which I prefer to disclose herein comprises a shell 1 and a core 2 therewithin, the core and shell being substantially elliptical in shape and being symmetrical about a major axis A—A and a minor axis B—B, the core and shell thus having substantially two portions or lobes on opposite sides of minor axis B—B. The core 2 comprises a plurality of open end tubes 3 having hexagonal shaped ends 4 which are enlarged and are mutually contiguous and secured together as by soldering or the like and substantially form end walls for the oil cooling chambers within the shell 1, there being spaces between the tubes which permit a flow of oil across and between the tubes within the shell 1. The core 2 is divided into four sections, namely, the upper core sections 2a and 2b and the lower core sections 2c and 2d. A plurality of warm-up and bypass tubes 5 extend crosswise of and between the upper and lower groups of the tubes 3 substantially along the major axis A—A, the tubes 5 being connected to a terminal manifold 6 and a return manifold 7, lying at opposite sides of the cooler.

The upper and lower core portions are secured together and to the shell 1 by a plurality of breathers, to compensate for contraction and expansion, as follows. A pair of main breathers 8 extend from the points 8a at the top of the cooler around the end portions of the shell to the points 8b in the bottom of the cooler, and are secured as by soldering to the perimetral portions of the tube ends 4. A pair of shorter breathers 9 placed respectively at the top and bottom of the cooler overlap the ends of breather members 8 and are soldered to them and engaged to the ends 4 of perimetral tubes 3. The upper and lower core sections are secured to a pair of center breathers 10 as by soldering of the tube ends 4 thereto. The ends 4 of the tubes 3 of the core sections adjacent and on opposite sides of the axis B—B are similarly secured to pairs of vertical channels 11, the inner ends of which are secured to the center breathers 10 and the outer ends are secured to small breathers 9.

Expansion of the shell and core substantially along the axis B—B is prevented by a plurality of tie rods 12, spaced along the axis B—B as shown in Figs. 2, 3, and 4. Tie rods 12 are provided with suitable securing nuts 13 and flanged washers or eyelets 14 which are seated in openings in the shell 1 as shown in Fig. 4. The center breathers 10 are each provided with outer flanges 15 to which tube ends 4 are soldered and a flexible channel portion 16 which permits the breathing action or expansion and contraction due to changes in temperature during different operating conditions.

The shell 1 comprises upper and lower outer plate members 17 which are corrugated or channeled, as at 18, to provide augmented surface area, the plates 17 being each secured to an inner shell plate 19, the ends of the upper and lower plates 19 overlapping the plates 20 which extend across the major axis A—A, whereby they are secured at one end to a manifold 7 and at the other end to a manifold 6.

A pair of end plates 21, as shown in Fig. 5, are secured to and overlap adjacent end portions of the plates 19. A pair of plates 22 are provided and each is secured to one of the plates 19 and provided with a plurality of flanged openings 23 which are aligned with similar openings in the plates 19. As shown in Fig. 7, the breathers 8 are each formed with an inner flange 25, to which the perimetrical tube ends 4 are secured, an outer flange 26, and a flexible web 27. The flanges 26 of the breathers 8 are connected to portions of the edges 28 of the plates 19 and to the inner flanges 30 of crescent shaped side plates 29, a pair of which are provided at each end of the core 2 to close the ends of the spaces existing between the ends of the core 2 and the end portions of the shell which extend around the manifolds 6 and 7. As shown in Figs. 4 and 8, strengthening or doubler plates 32 and 33 are provided to reenforce the central portions of the plates 19 and upper and lower pairs of gusset plates 35 are secured to the edges of the outer shell plates 17, as shown in Figs. 4 and 8.

As shown in Fig. 3, a plurality of spacers or filler strips 36 are positioned between the tubes 5 so as to form a baffle therewith and additional spacers 37 are provided between outermost tubes 5 and the walls formed by end portions 4 of the tubes 3. The central spacer 36, indicated by the numeral 36' is positioned between the central pair of tubes 5 and is provided with a plurality of apertures 39 aligned with apertures 40 in the adjacent tubes to provide a warm-up flow of oil therebetween, as will be explained hereinafter.

Return manifold 7 has a return flow chamber 41 and a plurality of fins 42 which extend outwardly from the wall 43 of the manifold 7 and form therebetween vertical flow passages 42' for the oil. A wall 44, Fig. 6, is formed in the terminal manifold 6, forming an inlet chamber 45 and an outlet chamber 46 therein. The manifold 6 is provided with lower and upper threaded openings 48 and 49 for the chamber 45, to which are secured flanged bushings 50 and 51, to the opposite ends of which are secured tubular members 52 and 53 which extend through flanged openings 23 in the plates 22 and openings in the shell plate 19. The manifold 6 is also provided with lower and upper threaded openings 54 and 55 for the chamber 46, to which are secured flanged bushings 56 and 57, the outer ends of which are secured to tubular members 58 and 59, which extend through additional openings 23 in the other plate 22. Additional tubular members 60 and 61 are provided which extend through plates 19 and 22, as shown. A mounting plate 62 is provided with apertures and is suitably secured to the ends of tubular members 52, 58, and 60, and an inlet manifold 63 is suitably secured to the plate 62 and is provided with an inlet chamber 64 and an inlet opening 65, and an inlet pipe 66 may be suitably secured thereto.

The chamber 64 has an outlet opening 67 in communication with tubular member 52. The manifold 63 has a wall 68 and a wall 69 forming a chamber 70 which is in communication with the tubular member 60. Walls 68 and 69 are provided with openings to receive a valve casing 71 which has a valve seat 72 in the chamber 64 and a plurality of apertures 73 in communication with the chamber 70. The manifold 63 is provided with a threaded counterbore 74 for threaded engagement with a valve stem guide member 75, which also forms a closure for the end of the valve casing 71. The member 75 is provided with a bore 76 to receive the end of a valve stem 77 which is provided with a valve closure 78 for the valve seat 72. A disc 79 is secured to the valve stem 77 and provides a seat for a packing ring 80 which is held thereagainst by a flanged retaining disc 81, and a spring 82 is secured between the member 75 and the retainer 81 to normally bias valve 78 in open position, a resilient expansion ring 83 being suitably secured in a groove in the casing 71 to provide a seat for the disc 79, and retain the valve closure assembly within the valve casing. An aperture 84 is provided in the guide member 75 and permits the expulsion of air from the interior of the casing 71 so that the valve 78 may be closed quickly upon a fluid pressure surge in the chamber 64 from the inlet 66 acting leftward against the disc or piston 79.

A mounting plate 85, substantially similar to the plate 62, is provided for and secured to tubular members 53, 59, and 61, and an outlet manifold 86 is secured thereto. The manifold 86 is provided with a plurality of valve seats 87, 88, and 89 and has a chamber 90 in which are positioned valve closures 91, 92, and 93 for the valve seats 87, 88, and 89. The manifold 86 is provided with threaded openings 94, 95, and 96 to receive the threaded closures 97, 98, and 99, the closures 97 and 98 securing valve guide rods 100 and 101 respectively, for the tubular stems of a pressure relief or bypass valve 91 and a check valve 92. A spring 102 is positioned between the closures 91 and 97 and a spring 103 is positioned between the closures 92 and 98, the spring 102 being substantially stiffer than the spring 103, the effect of which is that the closure 91 will be in closed position during normal operation under a pressure insufficient to open the bypass valve 91. The valve closure 93 is secured to a thermo-responsive mounting 104, such, for example, as a fluid filled bellows, secured to the closure 99 so constructed that the closure 93 will be in open position at relatively low temperatures and closed at a relatively higher predetermined temperature.

In the operation of the invention, the oil to be cooled enters under pressure from the inlet pipe 66 into the chamber 64 and during normal operation it is conducted past the valve 78 into the chamber 70 and through the tubular member 60 into the lower portion of the core 2. It thereupon passes over and under the tubes 3 under the baffle provided by the tubes 5 and spacers 36, 37, and 38, and upwardly through the spaces 42' between the fins 42 and thence in a reverse direction through the upper portion of the core 2 and out through the tubular member 61 past the valve 92 into the chamber 90 and out through the outlet pipe 105. Under these conditions, the valve closures 91 and 93 will be in closed position.

During the initial operation of the cooler and whenever the operating conditions thereof are at low temperatures such that the thermostatically controlled valve 93 is open and the viscosity of the oil is relatively low so that there is considerable back pressure due to fluid friction in the passages between the tubes 3, a flow of oil will occur from the chamber 64 through the tubular member 52 and the fitting 50 into the chamber 45 of the manifold 6. If the valve 91 is closed and the fluid pressure is not sufficient to open this valve, the flow will be through the tubes 5 leading from the chamber 45 to the chamber 41 of the manifold 7 and return through the tubes 5 which communicate with the chamber 46 of the manifold 6. The flow will thereupon be upwardly through the fitting 57 and the tubular member 59 into the chamber 90 past the valve 93 which, as stated above, will be in open position and the flow is thence out through the outlet 105. The flow of warm or hot oil through the tubes 5 will warm up the adjacent oil in the cooler core 2 to reduce the viscosity thereof so that a normal flow through the cooler will be established. Some of the flow of warm oil from the innermost tube 5, leading from the chamber 45, will pass into the adjacent tube 5 which leads into the chamber 46 through the apertures 40 therein and apertures 39 in the spacer 38. In this manner a short warm-up bypass is provided for the oil. If the back pressure through the bypass tubes 5 is relatively high due to low temperature of the oil therein, a bypass flow of oil will occur from the chamber 45 through the fitting 51 and the tubular member 53 past the valve 91 into the chamber 90, since the valve 91 will be unseated by such pressure. This valve 91 will again seat when the back pressure in the chamber 45 of the manifold 6 drops to the valve closing pressure determined by the spring 102.

The construction of the cooler as described, being elliptical and having a major axis dimension substantially greater than that of the minor axis dimension, permits the placing of the cooler in limited spaces such as within the wings of an aircraft. It will be observed that the extreme dimensions of manifolds 63 and 86 are substantially within the limits of the dimension along the minor axis B. Manifolds 63 and 86 are such as to be reversible end for end on mounting plates 62 and 85 which may be desirable if either or both inlet and outlet pipes 66 and 105 are to be provided at the opposite side from that shown. Also, these manifolds are interchangeable since the spacing of the tubular members 52, 53, 58, 59, 60, and 61 are uniform. The mounting plates 62 and 85 are similar, but only five of the six outlets therein are employed at any one time. For example, it will be noted that when the manifold 64 is arranged as shown in Fig. 6, the lower end of tubular member 58 is closed by the wall 64' of the manifold 64. If the inlet pipe 66 is on the opposite side of the cooler, the manifold 64 will be turned end for end so that the inlet port 67 will communicate with the lower end of the tubular member 58, and the wall 64' will then close the lower end of the tubular member 52. If this is done, it will be necessary to interchange the valves 91 and 93 so that the bypass valve 91 will be aligned with the port 67 of the manifold 64 in its new position. This may be accomplished by turning the manifold 86 end for end or moving the valve 91 and its associated closure 97 to the position of the valve 93 and its associated thermostat 104 and closure 99, the valve 93 then being placed in the position of the valve 91, without changing the position of the manifold 86.

The shell 1 of the cooler comprises a unit capable of withstanding an internal pressure considerably greater than that to which it is normally subjected in the oil circulating system. Should there be a heavy oil surge, or should restriction of the flow of oil through the return pipe 105, Fig. 6, cause a build-up of pressure in excess of the maximum normal pressure for which the cooler is designed, the auxiliary core protecting valve 78 will close against the seat 72 in the manner previously described, and should there be a reverse surge through the return piping 105, the check valve 92 will prevent a reverse flow of oil from the chamber 90 through the tubular member 61 into the core of the cooler.

Vertical expansion of the shell due to oil pressure therein is prevented by the tie rods 12 which act in tension. Outward pressure against the walls of the shell between the ends of the tie rods and the manifolds 6 and 7, results in tension in the side walls and inward pressure against the manifolds 6 and 7, inward movement of which is prevented by the intercommunicating tubes 5 which are placed in compression. As shown in Fig. 1, the walls of the shell extend from the points X near the plane B—B to the points y at the extreme sides of the cooler through arcs, each of which has a single radius R. Accordingly, the four sections X—Y of the cooler shell comprise cylindrical segments, each of which are placed in tension when pressure is applied internally to the cooler, but which are so formed and supported that warpage or material change in curvature will not occur therein. The core 2 may be regarded as floatingly supported within the shell by the breather members 8 and 9 so that relative expansion and contraction of the core may occur without injury to the structure or joints between the cooperating parts.

The alternative form of breather 110, as shown in Fig. 9, comprises a metal wall 111 shaped so as to have the form of a channel, this channel having substantially parallel side walls 112 and 113 adapted to be secured to the core 2 and the outer wall or shell of the cooler, including the wall 20. The breather wall 111 has an interconnecting portion 114 in the form of a reverse bend in a position offset toward the core 2 so as to have a partial overhanging relation to the periphery of the core 2.

I claim as my invention:

1. In fluid cooling means, the combination of: an oval core; an oval shell for said core having fluid inlet and outlet means; a unitary baffle and bypass means in said shell comprising a plurality of forward and return ducts extending across the interior of said core in a plane coinciding with the major axis of the shell, spacers between said ducts, and manifold means for the ends of said ducts, said manifold means being connected to said shell so that said baffle and bypass means will resist longitudinal contraction of said shell; and means to connect at least one of said manifold means with said inlet and outlet means.

2. In a cooler of the character described having a core defining passages for a fluid and a coolant, the combination of: a shell to contain said core comprising upper and lower walls disposed above and below a longitudinal plane, a compression member extending along said longitudinal plane from end to end of said shell, said compression member comprising a plurality of longitudinal ducts and manifolds at the ends of said compression member communicating with said ducts and being connected to the ends of said upper and lower wall members, one of said manifolds having ported inlet and outlet chambers therein respectively connected to the near ends of different ducts of said compression member and the other of said manifolds having a passage connecting the other ends of said different ducts and said different ducts having therebetween a number of small intercommunicating passages spaced along the length thereof, tension means extending through said shell in a transverse plane in crossing relation to said longitudinal plane, said tension means being shorter than said compression member and being connected to the intermediate portions of the upper and lower walls, said upper and lower walls converging toward the end of said compression member and being each convexly curved from a position adjacent said transverse plane toward the ends of said compression member; and means connecting the edge portions of said upper and lower walls to said core.

3. In a fluid cooler, the combination of: an oval core; an oval shell for said core having fluid inlet and outlet means; means including a plurality of forward and return ducts extending across the interior of said core, longitudinally thereof, in a plane coincident with the major axis of the shell and manifolds at the respective ends of said ducts for bypassing fluid from said inlet to said outlet; and means joining said ducts to each other and to the walls of the core to constitute a baffle for separating the space within the core into a plurality of compartments, said baffle and bypass means, including said manifold, being interposed between the end portions of said shell in compression resisting engagement therewith to constitute a strut for resisting deformation of shell under the expansive force of fluid passing through said core.

4. A cooler as defined in claim 3, wherein said core includes peripheral core wall members spaced from said end portions of the shell to define spaces accommodating said manifolds.

BRUCE BURNS.